July 6, 1965  D. D. TAYLOR  3,192,690
SEALING RING WITH E-SHAPED RADIAL SECTION
Filed Jan. 3, 1963  3 Sheets-Sheet 1
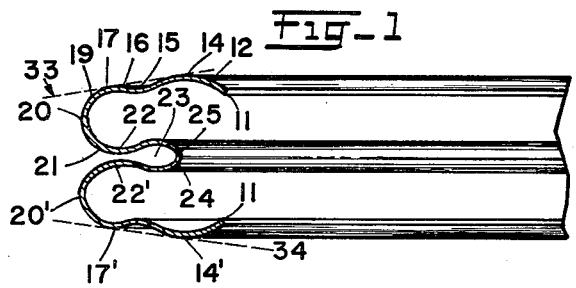
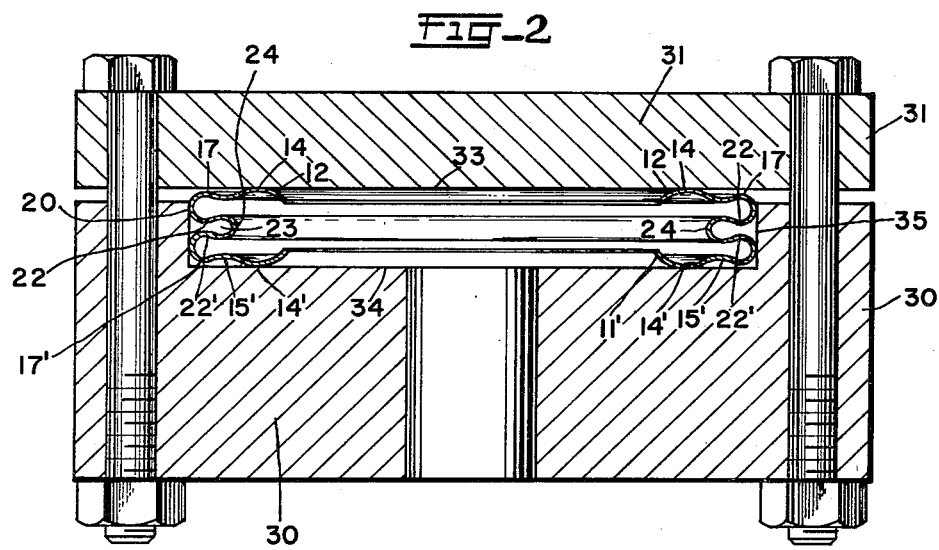
INVENTOR
DUDLEY D. TAYLOR
BY Henry H Snelling
ATTORNEY July 6, 1965

D. D. TAYLOR 3,192,690

SEALING RING WITH E-SHAPED RADIAL SECTION

Filed Jan. 3, 1963

INVENTOR
DUDLEY D. TAYLOR

BY Henry H Snelling

ATTORNEY

July 6, 1965  D. D. TAYLOR  3,192,690
SEALING RING WITH E-SHAPED RADIAL SECTION
Filed Jan. 3, 1963  3 Sheets-Sheet 3
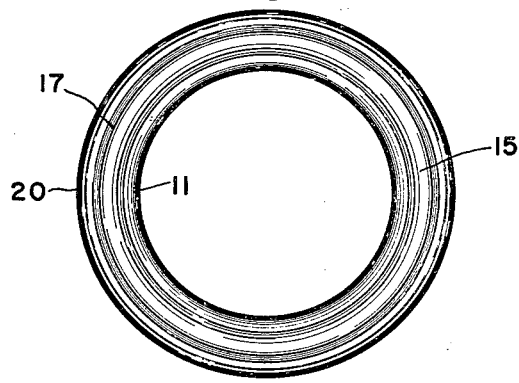
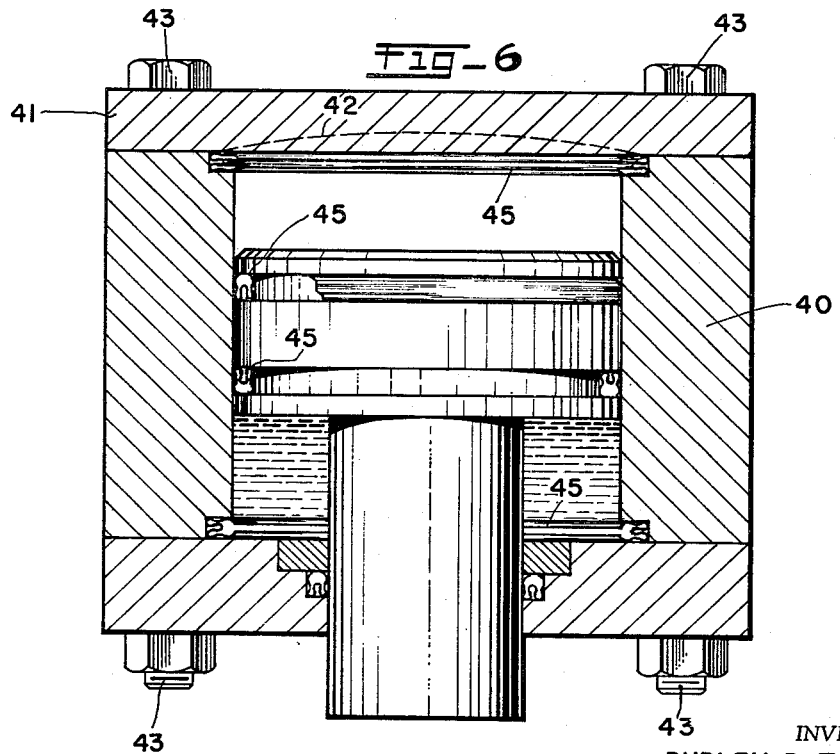
INVENTOR
DUDLEY D. TAYLOR
BY Henry H Snelling
ATTORNEY United States Patent Office 3,192,690
Patented July 6, 1965

3,192,690
SEALING RING WITH E-SHAPED
RADIAL SECTION
Dudley D. Taylor, 11623 35th Place, Beltsville, Md.
Filed Jan. 3, 1963, Ser. No. 249,194
4 Claims. (Cl. 220—46)

This invention relates to metal sealing rings and has for its principal object the provision of a sealing ring of long fatigue life particularly suitable for use in airplane hydraulic systems where weight of the components to be sealed is minimized and the sealing surfaces therefore deflect large amounts, such seal being sufficiently flexible to follow deflections in the sealing surfaces for enormous numbers of cycles while maintaining contact between the seal and the sealing surfaces without relative motion of the parts at the lines or areas of contact.

A further object of the invention is to provide a seal for use with low pressures of about 6,000 lbs. per square inch and where the pressures are applied a large number of times, such as 5,000,000 cycles, of such configuration that the sealing surface will not be injured by fretting corrosion.

A further object of the invention is to provide a seal having two roughly parallel arms each having an inwardly directed depression between spaced lines of sealing whereby a cancellation of bending moments is secured at points or lines of mechanical support where seal fatigue failures would normally occur.

A further object of the invention is to provide a metal seal suitable for use in the hydraulic systems of airplanes where often it is imperative to use a seal which can be removed from its groove after the pressure has been removed without the use of tools. A specific feature is to provide a seal which, as pressure and temperature are increased, must increase in diameter without sliding, this feature being obtained by providing a central convolution in the seal which pressure tends to straighten.

An additional object of the invention is to provide a series of seals of such configuration that as the nominal diameters of the members of the series increases, the efficiency of the seal increases.

C-ring seals have proven excellent for many airplane uses but where to save weight, portions of the systems have been reduced in thickness and consequently weakened, therefore deflecting to a greater extent and especially where such deflections are large for low pressures and the pressures are applied hundreds of cycles or more, it has been found that the C-ring seals tend to follow the deflections with a consequent slight relative movement of the seal with respect to the sealing surface. In a given time a crack will be found around the outside diameter of the C-ring seal caused by fatigue of the seal material or the seal will wear away the sealing surface.

To minimize at least, if not to eliminate, the sliding problem just mentioned the present seal is provided with two spaced lines of support placed as near as possible to the plane of the sealing surfaces. This non-sliding action is aided by the central convolution in the hoop stress direction and which therefore tends to straighten out when the pressure is applied, developing a compressive stress in the seal material located at the lines of support thus providing additional sealing force as the range stress is reduced. As in most cases of airplane hydaulic systems the sealing surface deflections vary proportionately with the overall diameter of the sealing ring, it is noteworthy that the convolution and its action become more effective with increase in diameter size. At the present time the new sealing rings are made in sizes varying from less than a quarter of an inch to as much as a 15" diameter and with varying overall depths or heights with an eighth of an inch as a medium size.

In sealing hydraulic systems one great problem has been the fatigue of the metal seals and the sealing surfaces due to the high psessures and temperatures involved. Frequently seal fatigue becomes apparent as a crack in the seal structure itself often running around the outside diameter of the ring. It is believed that the surface sealing fatigue is really a fretting corrosion of the surfaces resulting when two surfaces rub back and forth at high contact pressure, the fretting corrosion appearing as a pitting of the surfaces and this in turn causing leakage.

Some metal seals will be effective for a few cycles of pressure and temperature in this application; however, due to the pitting, leakage will result. Temperature plays an important role due to the fact that the mechanical properties of the materials involved are changed. For example: (1) the fatigue strength is reduced by increased temperature, (2) the coefficient of friction between the seal and the sealing surface is reduced, and (3) the surface oxide film always present on metals may soften or decompose. The coefficient of friction is an important parameter in problems where sliding occurs. A good illustration of the effect of change in properties of oxide films has been observed in the use of chrome plating. At room temperature the chrome will resist fretting corrosion, however at only 400° F. the oxide film softens and decomposes exposing the pure chrome metal with the result being fretting corrosion.

The present seal while originally intended for hydraulic systems, is equally applicable to systems sealing against gas leakage at both high and low pressures.

In the drawings:

FIG. 1 is a partial radial section through a fully expanded sealing ring;

FIG. 2 is a cross section of the ring installed in the proper size cavity but with the closure plate shown out of contact with the cylinder;

FIG. 5 is a plan view on a different scale; and

FIG. 6 shows a piston and cylinder using four sealing rings.

Figure 3:
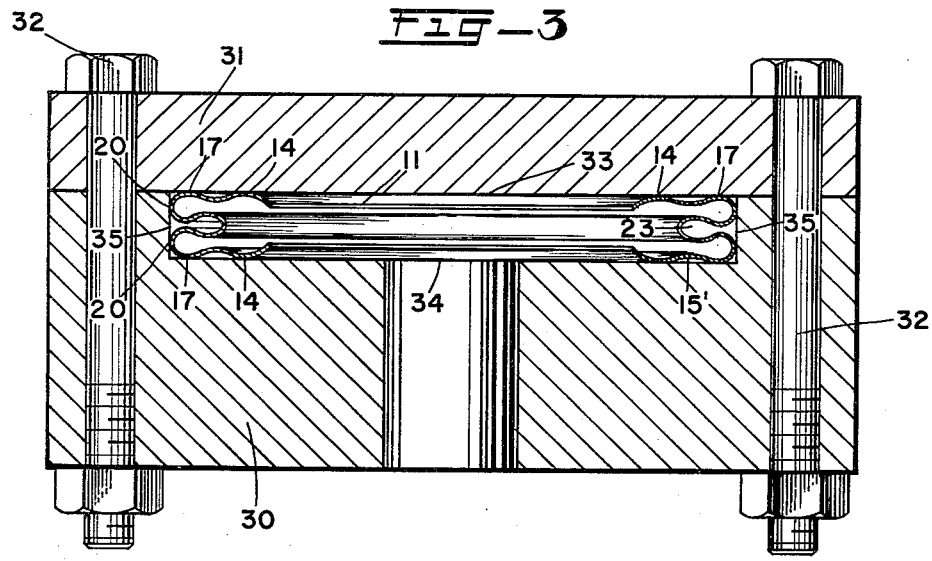
FIG. 3 is a similar view with the seal further squeezed and the plate closed on the cylinder.

The sealing ring of the present invention is known commercially as an E-ring because of the resemblance of its radial section, as best seen in FIG. 1, to a capital E, the upper and lower arms being smoothly sinuous, and the back of the E being broken by a central loop or convolution which forms the short horizontal central member of the E.

Beginning at the upper margin 11 of the radial section shown in FIG. 1 the metal, preferably "Inconel X," curves upwardly to form a convex portion 12 which contains point 14 which represents the first sealing line (which is in a plane at right angles to the plane of the drawing), next there is a wide and important depression 15, followed by a turn forming about three-quarters of a full circle and including consecutively in order a convex portion 16 containing point 17 representing the second sealing line 18, likewise at right angles to the plane of the drawing, convex portion 19 which contains point 20 representing the first mechanical support line, and portion 21 forming the mouth 22 of the loop or convolution 23. The end 24 of the convolution contains the point 25 representing the neutral axis. The other or lower half of the radial section is exactly the same reversed so the same numerals are applied using a prime in each case. It will be understood that points 14, 17, 20 and 22 represent circular lines. It will be noted from FIGURE 1 that the seal is symmetrical with respect to a plane passing horizontally through the neutral axis and that that the seal is formed from a circular piece of metal of uniform thickness and axial length.

Certain relationships should be noted, for example points 22, 22' and 25 lie between planes at right angles to the drawings and which planes contain respectively points 17–17' and 14–14'. Also that when points 22 and 22' are in contact, not appreciably over 5% further compression should be used. The distance from line 20 to surface 33 and the similar distance from line 20' to surface 34 are approximately twice the thickness of the metal of the ring seal. The metal strip forming the seal, wherever possible to use a metal or other covering, is coated with a sufficient thickness of silver, gold, Teflon, etc., to insure the filling of irregularities in the contacting surfaces so as to provide a leak-proof surface.

Figure 4:
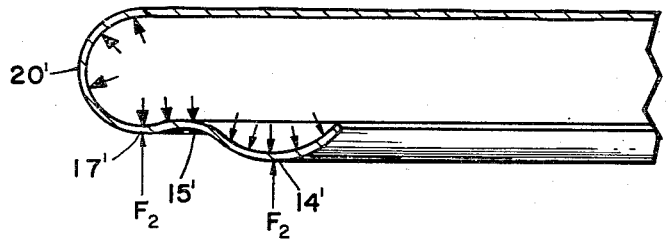
FIG. 4 is a partial radial view showing pressures applied.

The depression 15 in the seal between lines 14 and 17 serves a very important function. Referring to FIG. 4 we see that when the pressure is applied to the inner or convex side of the seal depression 15', forces $F_2$ are generated at lines 14' and 17'. Also point 20' tends to curl inward (toward the pressure). This curling inward is directly opposite to what the pressure is trying to do to the seal between 20' and 17'. Thus a cancelling of the bending moments is obtained at 20'. Line 20' is where the seal fatigue failure normally occurs. The pressure forces on the convolution 23 between lines 22 and the neutral axis 25 produce the same effect as the depression 15 between 14 and 17 due to the change in curvature of the metal between 22 and 25 and between 22' and 25. This cancelling of bending moments gives the seal long fatigue life.

In FIG. 2 the E-ring seal is installed in a typical cavity including a cylinder 30 and a cover plate 31, the initial squeeze imparted being such as to cause points 22 and 22' to approach each other but not to touch. As the cover plate is lowered the seal lines 14 and 14' are first engaged and the portions 12 and 12' are gradually made to approach each other until the cover plate makes contact with second sealing line 17 at which time all parts are as illustrated in FIG. 3, cover plate 31 firmly engaging the cylinder 30 by the tightening of the usual bolts or other fasteners (not shown). This has resulted in a bending moment about the mechanical support line 20 as both seal lines 14 and 17 are in engagement with the sealing surface 33 of cover plate 31 and similarly seal lines 14' and 17' are in corresponding contact with sealing surface 34 of the cylinder 30 and both lines 20 and 20' snugly contact the cylindrical wall 35 of the cylinder.

While not so shown in FIG. 3 a still further initial squeeze (compression) may be applied to the seal if desired but only to an amount such as would cause lines 14 and 14' to move inwardly and away from surfaces 33 and 34 due to the generation of a new system of forces and bending moments. While the seal will still function with the seal thus in contact with surface 33 by line 17 and surface 34 by line 17' only, it is not desired, so the amount of initial squeeze that can be applied after lines 22 and 22' contact and before line 14 moves inward of sealing surface 33 should be limited to about 5% of the initial height of the seal.

It is intended that the total squeeze range, that is, from where the lines 14 and 17 are in contact with sealing surface 33 to where line 14 is forced to leave that surface, shall be about 10%. As previously stated, in order for an E-ring to move in the manner stated, the neutral axis 25 of convolution 23 must lie in the area outlined.

FIGURE 6 is a highly diagrammatic view illustrating the deflections due to reductions in metal thickness to save weight. The cylinder 40 will tend to bow to barrel shape and the cover 41 will bend as greatly exaggerated by the dashed line 42. Thus the securing means 43 not only will become extended but will also tilt away from each other. The sealing rings 45 will however take care of these movements without relative movement of the parts at their areas of contact.

What I claim is:

1. A metal sealing ring for airplane hydraulic systems to seal a cavity containing a fluid subject to repeated changes in pressure, said ring being of uniform thickness and of a form in radial section roughly resembling an E, the upper and lower arms of the E being slightly flaring and being adapted to become parallel when installed in its cavity, said arms each including a sinuous configuration including two outwardly convex portions separated by a slight depression having on the inside of the seal a convex surface facing the interior of the ring, and the central bar of the E being a loop and having its two sides normally out of contact with each other.

2. The ring of claim 1 in which each rear convex portion of the radial section joining an arm to the loop includes an arc greater than 180°.

3. The combination with a cylinder having a cavity therein bounded in part by a cylindrical wall and a flat surface normal to the axis of said wall, and a cover plate having a flat face, of a sealing ring in said cavity engaging the cover with a plurality of spaced sealing line contacts, engaging the flat face of the cavity with a plurality of spaced sealing line contacts and engaging the cylindrical wall of the cavity with a plurality of spaced mechanical line contacts, the sealing ring having between said proximate mechanical line contacts an annular inwardly directed loop and the thickness of the sealing ring is roughly one-half of the distance between parallel planes, one containing a circular line of mechanical support and the other plane being the proximate flat surface of the cavity.

4. The combination with a body having a cavity bounded by a cylindrical wall rising from a flat sealing surface and a cover plate having a flat face forming one side of the cavity; of a sealing ring engaging the flat sealing surface, the cylindrical wall and the inner surface of the cover plate; said sealing ring having a radial section of general E-shape, the short horizontal bar of the E being a loop with the two sides of the loop slightly out of contact with each other when the cover plate is in contact with the outer surface of the body, the neutral axis being at the inner end of the loop, and the sealing ring having the upper and lower arms of the E each provided with two spaced convex portions touching the cover plate and the flat sealing surface of the cavity, said convex portion of the arms being separated by a depression having a convex portion facing the interior of the ring and the arms therefore each having a concave portion facing the proximate flat surface so that the sealing ring resiliently engages the cover plate and the flat sealing surface each in two spaced circular lines and engages the cylindrical wall in two spaced circular lines.

References Cited by the Examiner
UNITED STATES PATENTS
2,303,642   12/42   Hoy _____ 285—100
FOREIGN PATENTS
95,267   6/22   Switzerland.

THERON E. CONDON, *Primary Examiner.*